May 5, 1959    L. DUNNING    2,885,147
REGISTERING METER RE-SETTING MEANS
Filed Aug. 1, 1955    2 Sheets-Sheet 1

INVENTOR.
Leighton Dunning,
BY Paul & Paul
ATTORNEYS.

May 5, 1959
L. DUNNING
2,885,147
REGISTERING METER RE-SETTING MEANS
Filed Aug. 1, 1955
2 Sheets-Sheet 2
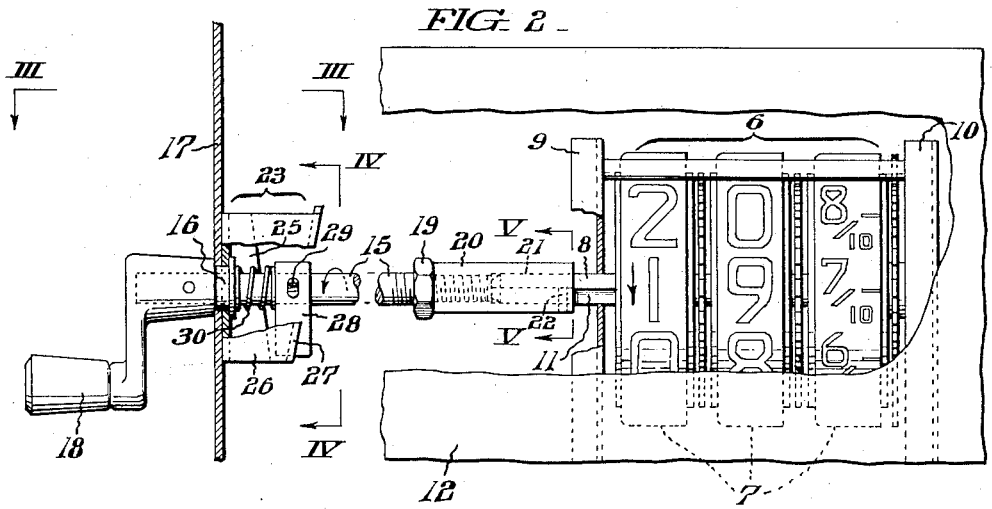
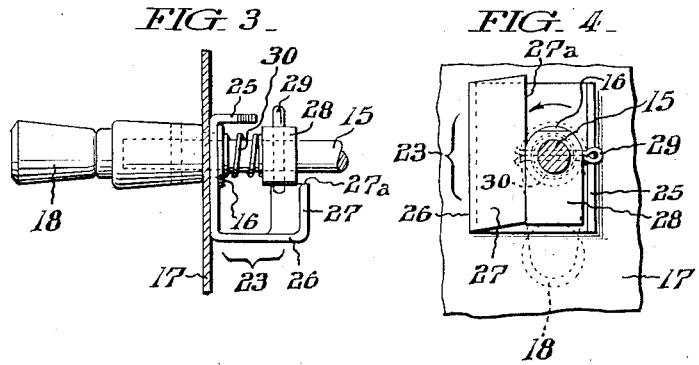
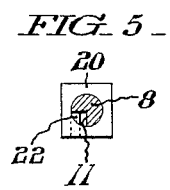
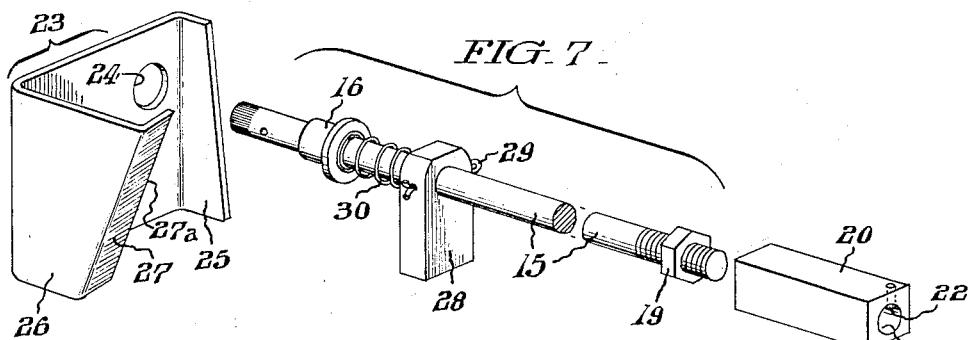
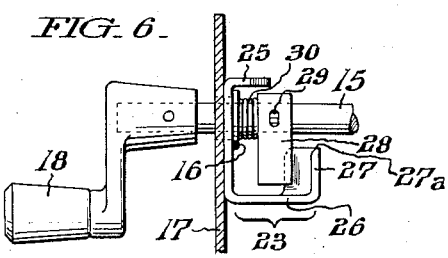
INVENTOR.
Leighton Dunning,
BY Paul & Paul
ATTORNEYS.

United States Patent Office 2,885,147
Patented May 5, 1959

2,885,147

REGISTERING METER RE-SETTING MEANS

Leighton Dunning, Philadelphia, Pa., assignor to William M. Wilson's Sons, Inc., Lansdale, Pa., a corporation of Pennsylvania Application August 1, 1955, Serial No. 525,759

1 Claim. (Cl. 235—144)

This invention relates to means useful in re-setting registering meters such as are used in connection with apparatus for dispensing oils, gasoline and other liquid commodities.

The chief aim of my invention is to provide a simple, reliable and inexpensive meter re-setting means capable of ready installation in standard forms of liquid dispensing apparatus of the kind referred to.

Other objects and attendant advantages will appear from the following detailed description of the attached drawings, wherein:

Fig. 2 is a broken out fragmentary view in section taken as indicated by the angled arrows II—II in Fig. 1 and drawn to a larger scale.

Figs. 3, 4 and 5 are detail sectional views taken as indicated respectively by angled arrows III—III, IV—IV and V—V in Fig. 2.

Fig. 6 is a view similar to Fig. 3 with the parts of the re-setting means differently positioned; and Fig. 7 is an exploded view showing the component parts of the re-setting means juxtaposed.

Figure 1:
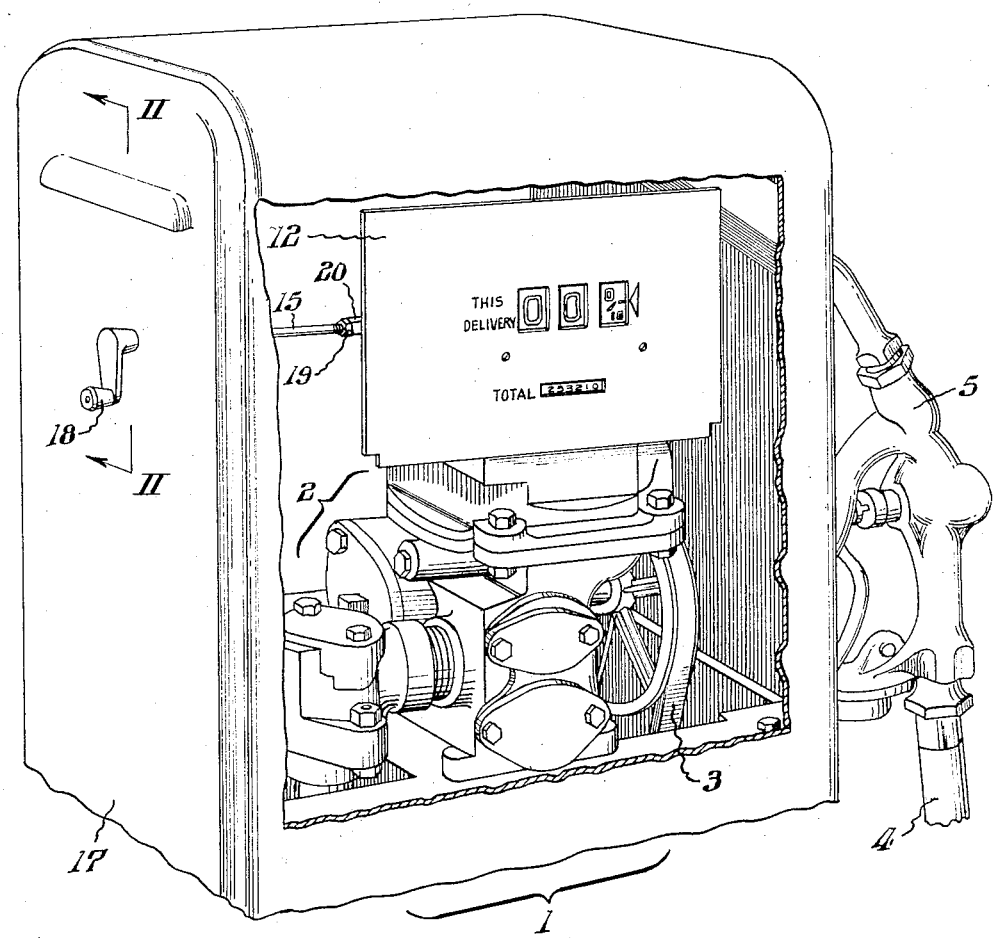
Fig. 1 is a perspective view showing the upper portion of a typical columnar liquid dispensing apparatus with a part of the front wall of its housing broken out and the usual sight glass removed to expose the lift pump unit and panel of the registering meter, and showing, in part, the re-setting means of my invention.

The liquid dispensing apparatus herein exemplified has a columnar casing 1 whereof the upper portion is occupied by a standard form of pump unit 2 which is arranged to be driven by a belt 3 from an electric motor (not shown) for delivery of liquid from an underground storage tank (not shown) under control of a manually operable nozzle 5 at the terminal end of a drain hose 4 in a well-known manner. The amount of liquid dispensed at each operation of the apparatus is indicated by a register comprehensively designated 6 in Fig. 2, said register being of standard construction and suitably geared to a meter (not shown) for actuation thereby. As usual, the number wheels 7 of the register 6 are all mounted upon a horizontal shaft 8 supported for rotation in laterally spaced bearing members 9 and 10. Also as usual, the shaft 8 is provided with a longitudinal groove 11, and one end thereof protrudes somewhat beyond the bearing member 9. During the pumping, the wheels 7 of the register 6 are rotatively shifted for presentation of the numerals thereon at apertures in a reading panel 12 suitably secured to bearing members 9 and 10, at the front, as well understood in the art.

The means, with which my invention is more especially concerned, for re-setting the number wheels to their zero positions, with which my invention is more especially concerned, comprises a supplemental shaft 15 which is axially aligned with the shaft 8 of the register 6 and which extends outwardly through a bearing 16 set into the left hand side wall 17 of the casing 1, and is provided at its outer end with a manipulating member in a form of a hand crank 18. Threadedly engaged upon the inner end of the supplemental shaft 15 and adjustably secured thereon by a jamb nut 19 is a square section sleeve 20 whereof the distal end is plain bored as at 21 to slidingly fit over the protruding end of the shaft 8 of the register 6 as best shown in Fig. 2. A pin indicated at 22 is secured laterally into sleeve 20 projects into the groove 11 in the shaft 8 of the register 6 for the purposes of a sliding spline connection. Welded or otherwise secured to the inner face of the side wall 17 of the casing 1 is a bracket-like member 23 which is apertured at 24 for passage of supplemental shaft 15 through it. As shown, the member 23 is struck from suitably stiff plate metal and formed with parallel wing projections 25 and 26 whereof the latter has a flange 27 which is inclined with respect to a plane normal to the supplemental shaft and of which the inner side provides a cam surface. Arranged to cooperate with the projection 23 in a manner presently explained is a short arm 28 which is secured to the supplemental shaft 15 by a cotter pin 29; and interposed between said arm and the main web of the member 23 is a helical compression spring 30. As viewed in Fig. 4, the width of arm 28 is slightly less than the space between the projection 25 and the edge of flange 27 of projection 26 at 27a.

To re-set the registering meter 6 after a dispensing operation of the apparatus, i.e., to restore the number wheels 7 to zero position, the hand crank 18 is manipulated to rotate the supplemental shaft 15 and the register shaft 8 in the direction indicated by the arrows in Figs. 2 and 4, i.e., in the same direction in which the latter shaft is turned during a dispensing operation of the apparatus. As the supplemental shaft 15 is so rotated and is turned through a half revolution, the arm 28 thereon engages behind the inclined flange 27 of the cam projection 26 of the member 23 as shown in Fig. 6 with the result that said shaft is moved leftward against the resistance of the spring 30 without complete disconnection of the sleeve 20 from the shaft 8 of the register 6. At the end of a complete revolution of the hand crank 18, the arm 28 is stopped against wing projection 25—thus preventing the number wheels 7 of the register from being set back beyond their zero position, and is then released from the cam flange 27 and, by action of the spring 30 upon the shaft 15, said shaft is shifted endwise back to the normal position in which it is illustrated in Figs. 2–4, with said arm stopped by the lower end of said flange to thereafter prevent the supplemental shaft 15 (and the register shaft 8) from benig turned reversely to the intended direction.

It is to be understood that the illustrated registering meter is of a well known commercial type not, per se, of my invention, the shaft 8 being normally quiescent and restrained against axial shifting whereon the numbered wheels are mounted with capacity for independent rotation in one direction. As hereinbefore pointed out, the wheel at the extreme right in Fig. 2 is geared to a device associated with the pump and bolted to the top of the latter as shown in Fig. 1 which measures the amount of liquid dispensed as the pump is operated. As is characteristic of such registering meters, each time that the rightmost wheel 7 is turned through a complete revolution, the next adjacent one is rotatively shifted through 1/10 of a revolution, and when the latter has been turned through a complete revolution, the leftmost wheel of the group is rotatively shifted through 1/10 of a revolution. Each wheel 7 has a pawl connection (not shown) with the shaft 8 such that when said shaft is rotated through one revolution for resetting, the wheels 7 are all returned to zero position.

While in accordance with the provisions of the statutes, I have illustrated and described the best forms of embodiment of my invention now known to me, it will be apparent to those skilled in the art that changes may be made in the form of the apparatus described without departing from the spirit and scope of the invention, as set forth in the appended claim, and that in some cases certain features of my invention may be used to advantage without a corresponding use of other features.

Having thus described my invention, I claim:

A re-setting attachment for a register housed within the protective casing of a liquid dispensing apparatus and having a horizontally-arranged actuating shaft, said attachment comprising an aligned coaxial supplemental shaft slidingly passed through a bearing in a side wall of the casing and spline-connected at its inner end to the actuating shaft of the register; an arm affixed to the supplemental shaft within the casing; an operating hand crank fast upon the external end of the supplemental shaft, spring means urging the supplemental shaft inwardly of the casing; and a bracket-like member affixed to the inner face of the said casing wall providing, to one side of the supplemental shaft, a projection with a cam surface which is inclined with respect to a plane normal to the supplemental shaft, and a stop at the opposite side of the supplemental shaft whereby, as the hand crank is turned in re-setting the register the arm engages said cam surface and causes the supplemental shaft to be axially shifted against the force of the spring in the course of substantially a full rotation of the hand crank and advance of the arm beyond the cam surface of the projection, said arm being arrested by engagement with the stop upon completion of a rotation, and then the auxiliary shaft is automatically shifted back to its original position by reaction of the spring.

References Cited in the file of this patent

UNITED STATES PATENTS

| | | |
|---|---|---|
| 885,514 | Odner | Apr. 21, 1908 |
| 901,748 | Schuster | Oct. 20, 1908 |
| 1,413,713 | Enders | Apr. 25, 1922 |